Aug. 31, 1926.

H. L. BLOOD

CONTROL SYSTEM

Filed August 9, 1923   2 Sheets-Sheet 2

1,598,115

INVENTOR.
H. L. Blood
BY Wayne B Wells
ATTORNEY.

Patented Aug. 31, 1926.

1,598,115

UNITED STATES PATENT OFFICE.

HAROLD L. BLOOD, OF NORTH PLAINFIELD, NEW JERSEY, ASSIGNOR TO NILES-BEMENT-POND COMPANY, OF NEW YORK, N. Y., A CORPORATION OF NEW JERSEY.

CONTROL SYSTEM.

Application filed August 9, 1923. Serial No. 656,493.

My invention relates to control systems and particularly to control systems for governing the operation of machine tools.

One object of my invention is to provide a control system for a planer or a similar machine tool that shall be provided with auxiliary means for extending the limit of the motor feeding movements beyond the limit now possible when the usual limit switch is used in a control system.

Another object of my invention is to provide a planer control system of the above indicated character having a limit switch for limiting the length of the feeding movements effected by the feed motor that shall be provided with auxiliary means associated with the limit switch for extending the feeding movements of the motor beyond the limit possible to be effected by a limit switch.

A further object of my invention is to provide a control system of the above indicated character that shall be provided with a limit switch for effecting feeding movements of the feed motor and that shall be provided with auxiliary electrical means associated with the limit switch for extending the feeding movements of the feed motor to different multiples of the usual feeding movement.

In control systems for operating planers and others machine tools having a reciprocating member, it is usual to provide a main motor which is operated by a pilot switch in accordance with the movement of the reciprocating member. In many control systems the pilot switch not only controls the main motor for operating the reciprocating member, but also controls a feed motor for feeding and traversing the cutting tools carried by the machine. A limit switch, which is usually of the drum type, is mechanically connected to the feed motor and during the feeding operation limits the feed motor to a predetermined number of rotations. Thus, the pilot switch starts the operation of the feed motor and the limit switch limits or stops the feeding movement. In many cases it is desirable to effect a greater feeding movement than is possible with the usual type of limit switch. Thus, in certain finishing operations it is desirable to obtain a feed at least twice as large as can be effected with the usual type of limit switch. However, during roughing operations a very small feeding movement is desirable.

In a control system constructed in accordance with my invention, auxiliary electrical means is associated with the usual limit switch in order to effect feeding movements which are different multiples of the feeding movement now possible to be effected by the usual limit switch. Selective means is provided whereby the control system may be operated by the limit switch in the usual manner and effect normal feeding movements or may effect feeding movements which are different multiples of the normal feeding movements. The means disclosed for extending the limit of the feeding movements effected by the feed motor may be utilized in a system having a feed motor which operates in a continuous direction or in a control system having a feed motor which reverses in accordance with the movement of the planer table. Thus my invention is applicable to the control system disclosed in the patent to Keefer, et al., 1,299,192 dated April 1, 1919, and to the control system disclosed in the patent to Greenleaf, et al., No. 1,321,203 dated November 11, 1919.

In the accompanying drawings:—

Figure 2:
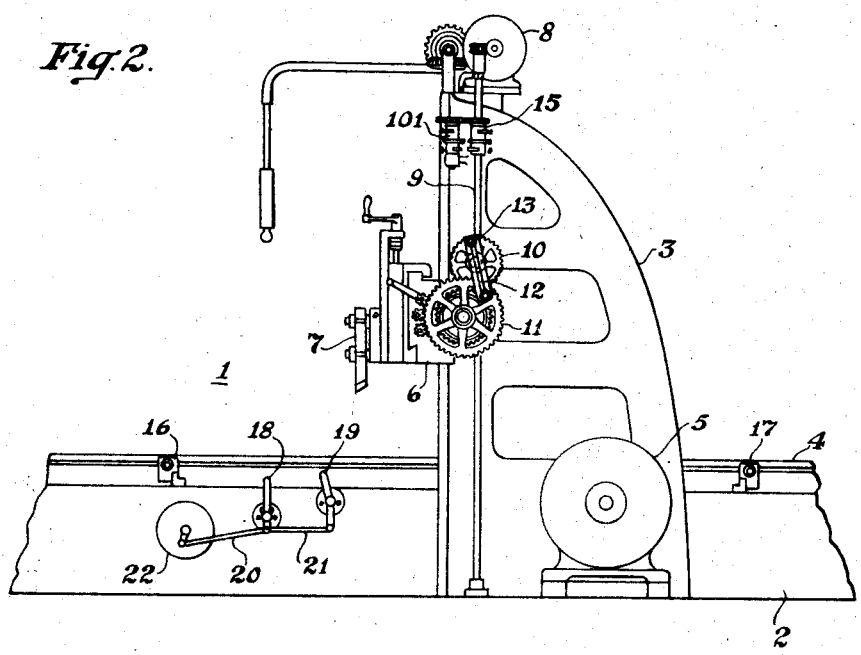
Fig. 2 is a front elevational view of a planer adapted to be operated in accordance with my invention.

Referring to Fig. 2 of the drawings, a planer 1 is shown which comprises a base 2 and uprights 3. A table 4, which carries the work, is reciprocated on the base 2 by means of a main motor 5. A cross rail 6, which carries the cutting tools 7, is adjustably mounted on the uprights 3. The cutting tools 7 are fed along the rail 6 by means of a feed motor 8 in any suitable manner. In Fig. 2 of the drawings, the motor 8 is shown mounted on the arch which connects the two uprights 3. A vertical shaft 9, which is located outside one of the uprights 3, is connected to the shaft of the motor by any suitable gearing. The shaft 9, in the usual manner, is connected by bevel gear wheels to a gear wheel 10 which controls the feeding and traversing movement of the cutting tools. The gear wheel 10 is connected to a feed gear wheel 11 by means of a connecting rod 12 and an adjustable pin 13. The pin 13 and the connecting rod 12 may be adjustable to effect limited changes in the feeding movement effected by the cutting tool. Inasmuch as the feeding connections to the cutting tool are fully described in the patent to Greenleaf, et al. and in the patent to Keefer, et al., referred to above, a further description thereof is deemed unnecessary.

In the above feeding mechanism, it will be noted the gear wheel 10 may be rotated in a continuous direction or may be oscillated through 180 degrees in order to effect feeding movements of the gear wheel 11. Thus the motor 8 may be rotated in one direction until the gear wheel 10 is moved through 180 degrees and may be reversed to return the gear wheel 10 to initial position or may continue its initial movement until the gear wheel 10 is back to initial position. The shaft 9 carries a limit switch 15 which will be described in detail when reference is made to Fig. 1 of the drawings.

The planer table 4 carries two dogs 16 and 17 which are adapted respectively to engage levers 18 and 19. The levers 18 and 19 are connected by links 20 and 21 to a pilot switch 22. The pilot switch 22 controls the main motor 5 and also the feed motor 8 in accordance with the movement of the planer table 4. At the end of the forward or cutting stroke of the planer table, the dog 16 engages the lever 18 to operate the pilot switch 22 so as to reverse the direction of rotation of the main motor 5. At the end of the return stroke of the planer table 4, the dog 17 engages the lever 19 to operate the pilot switch 22 so as again to reverse the direction of rotation of the main motor 5.

Figure 1:
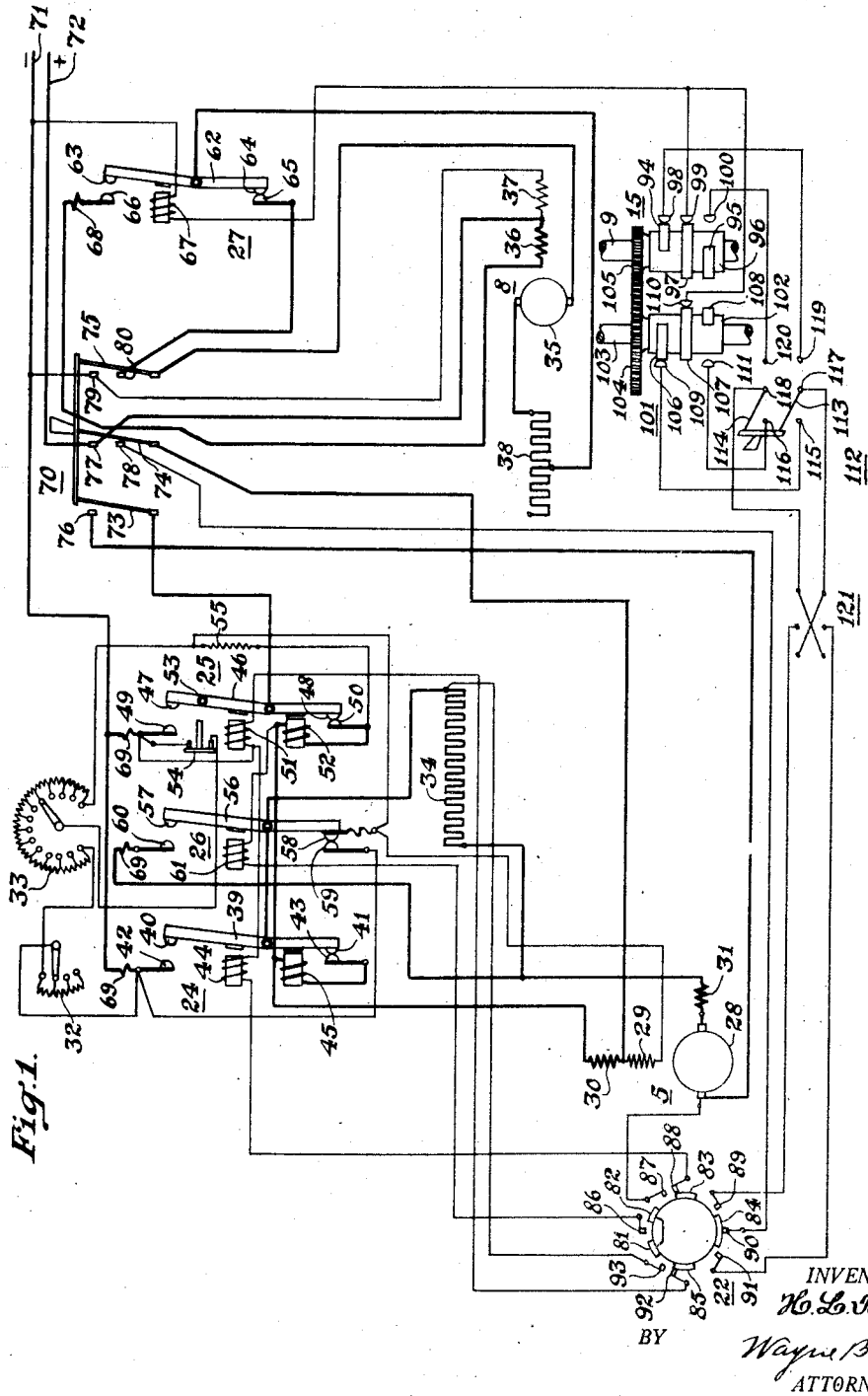
Figure 1 is a diagrammatic view of a planer control system embodying my invention.

Referring to Fig. 1 of the drawings, a control system is illustrated for controlling the planer 1 shown in Fig. 2 of the drawings. The main motor 5 is controlled by two main switches 24 and 25 and an accelerating switch 26. The feed motor 8 is shown controlled by a feed switch 27.

The main motor 5 comprises an armature 28, a shunt field magnet winding 29, a series field magnet winding 30 and an interpole winding 31. The shunt field magnet winding 29 is connected in circuit with two resistors 32 and 33 which are controlled in a manner to be hereinafter set forth for governing the speed of the main motor. An armature resistor 34, which is controlled by the accelerating switch 26, is provided for governing the acceleration of the main motor 5.

The feed motor 8 comprises an armature 35, a series field magnet winding 36, and a shunt field magnet winding 37. A resistor 38 is provided in the armature circuit of the feed motor 35 for dynamically braking the feed motor upon release of the feed switch 27.

The main switch 24 comprises a switch arm 39 which carries two contact members 40 and 41. The contact member 40 is adapted to engage a stationary contact member 42 when the switch is in an operative position and the contact member 41 is adapted to engage a stationary contact member 43 when the switch is in a released position. A main magnet 44 is provided for operating the switch arm 39 and a holding magnet 45 is provided for preventing operation of the switch arm 39 when the main switch 25 is in an operative position and also for preventing operation of the switch arm 39 when a dynamic braking current is flowing through the main motor.

The main switch 25 comprises a pivotally mounted switch arm 46 which carries two contact members 47 and 48. The contact member 47 is adapted to engage a stationary contact member 49 when the switch is in an operative position and the contact member 48 is adapted to engage a stationary contact member 50 when the switch is in a released position. A main magnet 51 is provided for operating the switch arm 46 and a holding magnet 52 is provided for preventing operation of the switch arm 46 when the main switch 24 is in an operative position and for preventing operation of the switch arm when a dynamic braking current is flowing through the main motor.

A pin 53 which extends from the side of the switch arm 46 is adapted to open a switch 54 when the main switch 25 is operated. Normally the switch 54 serves to exclude the resistor 32 and a portion of the resistor 33 from the circuit of the shunt field magnet winding 29. However, upon operation of the main switch 25 to effect a return stroke of the planer table 4, the switch 54 is opened to insert all the resistor 33 and the resistor 32 in the circuit of the shunt field magnet winding. Thus the speed of the motor during the return stroke of the main motor is increased. A preventative resistor 55 is included in the circuit of the shunt field magnet winding 29.

The accelerating switch 26 comprises a pivotally mounted switch arm 56 which carries two contact members 57 and 58. The contact member 58, which is insulated from the switch arm 56, is adapted to engage a stationary contact member 59 when the switch arm is in a released position. The contact member 57 is adapted to engage a stationary contact member 60 when the accelerating switch is in an operative position to short circuit the resistor 34. A magnet 61 is provided for operating the switch arm 56.

The feed switch 27 comprises a pivotally mounted switch arm 62 which carries two contact members 63 and 64. The contact member 64 is adapted to engage a stationary contact member 65 when the switch arm is in the released position and the contact member 63 is adapted to engage a stationary contact member 66 when the switch arm is in an operative position. A magnet coil 67 is provided for operating the switch arm 62. A blow-out coil 68 is associated with the contact members of the feed switch 27 and blow-out coils 69 are provided for the contact members of the main switches 24 and 25 and the accelerating switch 26.

A switch 70 is provided for connecting the control circuits to a supply circuit comprising conductors 71 and 72 and also for completing certain of the control circuits. The switch 70 comprises three switch blades 73, 74 and 75 which are adapted to engage contact members 76, 77, 78, 79 and 80. The pilot switch 22 comprises contact segments 81 to 85 inclusive, which are adapted to engage contact members 86 to 93 inclusive.

The limit switch 15, which is mounted on the shaft 9, comprises two contact segments 94 and 95, and a contact segment 97. The contact segments 94 and 95 extend half way around a drum 96 and the segment 97 encircles the drum 96. The contact segments 94, 97 and 95 respectively engage contact members 98, 99 and 100. Adjacent to the limit switch 15 is mounted an auxiliary switch 101 which serves to extend the feeding movements of the feed motor 8. The auxiliary switch 101 comprises a drum 102 which is mounted on a suitable shaft 103. The shaft 103 is connected to the shaft 9 by means of gear wheels 104 and 105. Preferably, the gear wheels 104 and 105 are of such size that the shaft 9 effects two rotations for each rotation of the shaft 103. It is to be understood, however, that my invention is not limited to any such ratio, inasmuch as my invention is equally applicable to other planers than the planer illustrated in the drawings. Three contact segments 106, 107 and 108, which are mounted on the drum 102, are respectively adapted to engage contact members 109, 110 and 111.

A two pole double throw switch 112 is provided for connecting the pilot switch 22 to the limit switch 15 and the auxiliary switch 101. The switch 112 comprises two switch blades 113 and 114 which are adapted to engage contact members 115 to 120, inclusive. A reversing switch 121, which is connected in the circuit between the pilot switch 22 and the limit switch 15 and the auxiliary switch 101, is provided for effecting feeding operation at either end of the stroke of the planer table.

Assuming the switch blades 114 and 113 of the switch 112 to respectively bridge the contact members 118 and 120 and 117 and 119, the feed switch 27 will be controlled by the limit switch 15 and the pilot switch 22 for effecting normal feeding movements of the feed motor 8. At the end of the cutting stroke, the dog 16 engages the lever 18, as shown in Fig. 2 of the drawings, to operate the pilot switch 22. The contact segment 85 is moved to bridge the contact fingers 92 and 93 and the contact segments 81 and 82 are moved to bridge the contact fingers 86 and 87. The bridging of the contact fingers 92 and 93 completes a circuit through the magnet 51 of the main switch 25. The circuit through such magnet extends from the supply conductor 71 through the magnet 51, contact fingers 92 and 93, which are bridged by the contact segment 85, switch arm 39, contact members 41 and 43, holding coil 45, series field magnet winding 30, and the switch blade 74 to the supply conductor 72.

The main switch 25 is operated to complete a circuit through the main motor 5. The circuit through the motor 5 extends from the supply conductor 71 through the contact members 49 and 47, switch arm 46, switch blade 73, armature 28, interpole winding 31, accelerating resistor 34, switch arm 39, contact members 41 and 43, holding coil 45, series field winding 30, and the switch blade 74 to the supply conductor 72. The main motor 5 is operated in a direction to effect a return movement of the table 4.

The contact segments 81 and 82, which bridge the contact fingers 86 and 87, serve to complete a circuit for operating the accelerating switch 26. The circuit for operating the accelerating switch extends from the supply conductor 71 through the contact members 49 and 47, switch arm 46, switch blade 73, contact fingers 87 and 86, which are bridged by the contact segments 81 and 82, magnet 61, series field magnet winding 30, and the switch blade 74 to the supply conductor 72. The accelerating switch 26 is operated to short circuit the resistor 34.

Prior to the operation of the accelerating switch, a circuit of the shunt field magnet winding 29 extends from the supply conductor 71 through contact members 59 and 58, winding 29, and the switch blade 74 to the supply conductor 72. Upon operation of the accelerating switch, the circuit of the shunt field magnet winding extends through the resistor 33 and the resistor 32. Thus the speed of the main motor is increased during the return movement of the planer table. As heretofore set forth, the switch arm 46 opens the switch 54 to insert all the resistor 33 and the resistor 32 in the circuit of the shunt field magnet winding.

The contact segment 84 on the pilot switch bridges the contact fingers 90 and 91 to effect a feeding movement by the motor 8. A circuit is completed by the contact segment 84 which extends from the supply conductor 71 through magnet coil 67, contact fingers 99 and 98, which are bridged by the contact segments 94 and 97, contact members 117 and 119, contact fingers 91 and 90, which are bridged by the contact segment 84, and the contact fingers 78 and 77, which are bridged by the switch blade 74, to the supply conductor 72. The feed magnet 27 is operated and a circuit is completed for operating the feed motor. The circuit through the feed motor extends from the supply conductor 71 through contact member 79, switch blade 75, armature 35, resistor 38, contact members 63 and 66, and the series field magnet winding 36 to the supply conductor 72. The feed motor 8 operates the gear wheel 10, shown in Fig. 2, through 180 degrees to effect a feeding movement of the cutting tool. Upon movement of the gear wheel 10 through 180 degrees, the contact segment 94 on the limit switch 15 disengages the contact member 95 to open the feed switch. The circuit of the feed motor is thus opened.

At the end of the return stroke of the planer, the dog 17 engages the lever 19 to reverse the position of the pilot switch. In the reverse position of the pilot switch, the contact segment 83 bridges the contact fingers 87 and 88 to complete a circuit for operating the main switch 24. The contact segments 81 and 82 bridge the contact segments 93 and 86 for operating the accelerating switch 26 and the contact member 84 bridges the contact members 89 and 90 for effecting movement of the feed motor 8.

Upon release of the switch 25, a dynamic braking circuit is completed through the main motor 5 which includes the two holding coils 45 and 52 and the resistor 34. The two holding coils 52 and 45 prevent the operation of either main switch until the dynamic breaking current ceases to flow. Upon release of the feed switch 27, a dynamic braking circuit is completed through the armature 35 and the resistor 38 by the engagement between the contact members 64 and 65.

The circuit completed by the contact segment 83 bridging the contact fingers 87 and 88 extends from the supply conductor 71 through the magnet 44, contact fingers 87 and 88, which are bridged by the contact segment 83, switch blade 73, switch arm 46, contact members 48 and 50, holding coil 52, series field magnet winding 30 and the switch blade 74 to the supply conductor 72. The main switch 24 is operated and a circuit is completed for operating the main motor to effect a cutting stroke by the planer table.

The circuit through the motor extends from the supply conductor 71 through the contact members 42 and 40, switch arm 39, resistor 34, interpole winding 31, armature 28, switch blade 73, switch arm 46, contact members 48 and 50, holding coil 52, series field magnet winding 30 and the switch blade 74 to the supply conductor 72. The accelerating switch 26 is then operated by a circuit which is completed by the contact segments 81 and 82 on the pilot switch. Upon operation of the accelerating switch, the circuit of the shunt field magnet winding 29 is completed through only a portion of the resistor 33 inasmuch as the switch 54 is maintained in closed position. Accordingly, the cutting stroke of the planer table is effected at a reduced speed.

The circuit completed by the contact segment 84 extends from the supply conductor 71 through the magnet 67, contact fingers 99 and 100, which are bridged by the contact segments 97 and 95, contact members 118 and 120, which are bridged by the switch blade 114, contact members 89 and 90, which are bridged by the contact segment 84, and contact members 77 and 78, which are bridged by the switch blade 74 to the supply conductor 72. The circuit of the feed motor 8 is then closed through the contact members 63 and 66 of the feed switch 27. Further movement of 180 degrees is effected of the gear wheel 10, as shown in Fig. 2 of the drawings. The movement of the gear wheel 10 serves to return the connecting rod 12 to initial position. The feed motor is stopped by the contact segment 95 disengaging the contact finger 100.

If it is desired to effect double feeding movement by the motor, the switch 112 is operated so that the switch blade 114 bridges the contact members 116 and 118 and the switch blade 113 bridges the contact members 115 and 117. The circuit for operating the feed switch 27 at the end of the cutting stroke extends from the supply conductor 71 through the magnet 67, contact fingers 110 and 109, which are bridged by the contact segments 106 and 107, contact members 115 and 117, contact fingers 90 and 91, which are bridged by the contact segment 84, and the contact members 77 and 78, which are bridged by the switch blade 74 to the supply conductor 72. The feed switch 27 is operated for completing a circuit through the feed motor 8.

The circuit completed through the feed motor 8 is maintained closed until the contact segment 106 is separated from the contact finger 109. However, the contact segment 106 is not separated from the contact finger 109 until the motor has rotated the gear wheel 10 through 540 degrees. By rotating such gear wheel through 540 degrees, it is apparent a double feeding movement is effected. The first 180 degrees movement of the gear wheel 10 effects a feeding movement of the cutting tool and the next 180 degrees movement of the gear wheel 10 returns the feeding mechanism to initial position. The third 180 degrees movement of the gear wheel 10 effects a second feeding movement of the feeding mechanism and the cutting tool. In order to effect such movement, the gear wheels 104 and 105, as heretofore set forth, are of such size as to rotate the shaft 103 at half the speed of the shaft 9. Moreover, the contact segment 106 is arranged to extend three-quarters of the way around the drum 102 whereas the contact segment 108 is arranged to extend only one-quarter the way around the drum 102. Thus, the circuit above traced through the magnet 67 for the feed switch 27 is maintained closed while the shaft 103 effects three-quarters of a rotation. The rotating of the shaft 103 three-quarters of a rotation effects one and one-half rotations of the shaft 9 and one and one-half rotations of the shaft 9 effects movement of the gear wheels 10 through 540 degrees. Thus, a double feeding movement of the motor is effected.

At the end of the return stroke, the contact segment 84 bridges the contact fingers 89 and 90 to effect a movement of the feed motor for moving the gear wheel 10 through 180 degrees. Such movement of the gear wheel 10 returns the feeding mechanism to initial position. The circuit completed by the contact segment 84 extends from the supply conductor 71 through the magnet 67, contact fingers 110 and 111, which are bridged by the switch blade 114, contact fingers 89 and 90, which are bridged by the contact segment 84, and contact members 77 and 78, which are bridged by the switch blade 74 to the supply conductor 72. The switch 27 is operated and a circuit is completed through the feed motor 8. The circuit through the feed motor is maintained closed until the contact segment 108 is separated from the contact finger 111. Inasmuch as the segment 108 extends only one-quarter of the way around the drum 102, it is apparent the shaft 9 will effect only one-half a revolution and accordingly the gear wheel 10 will rotate through only 180 degrees.

In the above system for effecting double feeding movement of the feed motor, it is apparent that it is immaterial whether the feed motor 8 is reversed at each end of the planer table movement or is operated in a continuous direction as above described. In order to simplify the above system no means is illustrated for effecting a traversing operation and no circuit braker and similar apparatus is illustrated. However, it is to be understood that my invention is equally applicable to systems provided with means for effecting traversing operation in either direction as in the patents above mentioned.

Figure 3:
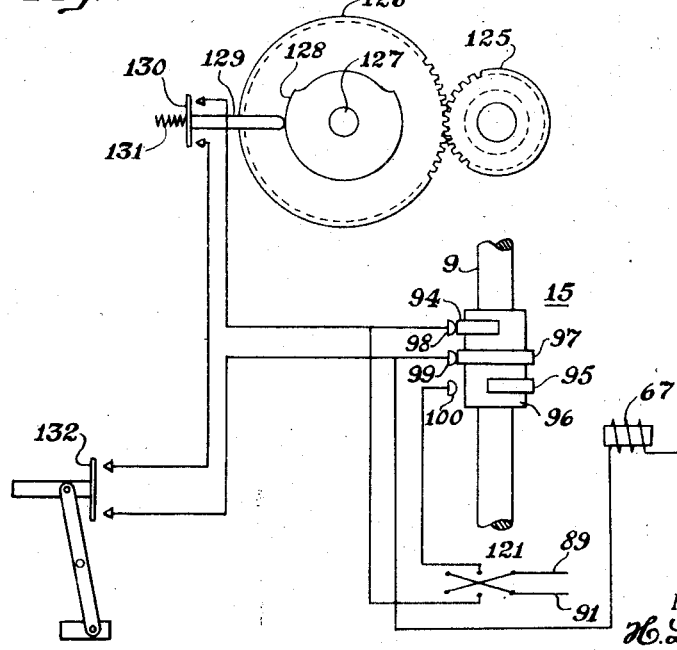
Fig. 3 is a diagrammatic view of a modification of my invention.

Referring to Fig. 3 of the drawings, a modification of my invention is illustrated for effecting double feeding movements of the motor. In the modification shown in Fig. 3, however, it is essential that the feed motor rotate in one direction. Inasmuch as the apparatus shown in Fig. 3 is adapted to operate in a system similar to that shown in Fig. 1, a complete control system is not illustrated. The shaft 9, which carries the limit switch 15, carries a gear wheel 125 which meshes with a second gear wheel 126. The gear wheel 126 is mounted on a shaft 127. The gear wheels 125 and 126 are of such size as to effect operation of the shaft 127 at one half the speed of the shaft 9. The shaft 127 also carries a cam member 128 which operates a plunger 129 to control a switch 130. The plunger 129 is forced into engagement with the cam member by means of a spring member 131. The automatically operated switch 130 is connected in circuit with a manually operated switch 132 across the contact fingers 98 and 99 of the limit switch 15. The contact finger 99 of the limit switch is connected to the coil 67 of the feed switch as in the system shown in Fig. 1. The two contact fingers 98 and 100 are connected to the contact fingers 91 and 89 of the pilot switch through the reversing switch 121 as in the system shown in Fig. 1.

When the pilot switch is operated at the end of the cutting stroke, a circuit is completed through the contact fingers 98 and 99 and the contact segments 94 and 97 for operating the feed switch 27. The feed switch serves, as heretofore set forth, to complete a circuit through the feed motor. The segment 94 on the drum 96, as shown in Fig. 3 of the drawings, serves to maintain the circuit of the feed motor closed until such motor has rotated the shaft 9 and the gear wheel 10 through 180 degrees. After the shaft 9 has been rotated through 180 degrees, the plunger 129 engages the lower portion of the cam surface on the cam member 128 to close the switch 130. It is assumed that the manually operated switch 132 has previously been closed in order to obtain double feeding movements by the feed motor. The circuit for the coil 67 of the switch 27 is then completed through the switch 130 and the switch 132 after the contact finger 98 is separated from the contact segment 94. The switch 130 is maintained closed by the cam member 128 until the shaft 9 has made a complete rotation. During such movement, it is apparent the gear wheel 10 is first returned to initial position and then effects a second feeding movement of 180 degrees. Thus, double feeding movement by the motor is effected.

When the limit switch is operated at the end of the return stroke, the circuit for the coil 67 of the feed switch is closed through the contact fingers 99 and 100 which are bridged by the contact segments 95 and 97. The contact segment 95, which extends halfway round the drum 96, maintains the circuit of the feed motor closed until the gear wheel 10 has made a rotation of 180 degrees. Thus the feed mechanism is returned to initial position. The cam member 128 is definitely set with regard to the limit switch 15 and serves to close the switch 130 for one complete rotation of the limit switch.

Modifications in the system, and in the arrangement and location of parts may be made within the spirit and scope of my invention and such modifications are intended to be covered by the appended claims.

What I claim is:—

1. In a control system for a machine tool, the combination with a feed motor for effecting feeding movements of the cutting tool on the machine, and a pilot switch for closing the motor circuit in accordance with the operation of the machine, of a limit switch rotated by the feed motor for opening the feed motor circuit after a predetermined feeding movement by the motor, and auxiliary means comprising a switch for changing the length of the feeding movement effected by the motor.

2. In a control system for a machine tool, the combination with a reciprocating member, a feed motor for effecting feeding movements of the cutting tool on the machine, and a pilot switch for closing the feed motor circuit at each end of the stroke of the reciprocating member, of a limit switch operated by the feed motor for opening the feed motor circuit after a predetermined feeding movement, a second limit switch operated by said feed motor and adapted to change the length of the feeding movements, and means for selectively connecting the feed motor to be controlled by one of said limit switches.

3. In a control system for a machine tool, the combination with a reciprocating member, a feed motor for effecting feeding movements of the cutting tool on the machine, and a pilot switch for closing the circuit of the feed motor in accordance with the operation of the reciprocating member, of two limit switches operated by the feed motor for limiting the feeding movements to different amounts, and a switch for connecting the feed motor to be operated by either one of said limit switches.

4. In a control system for a machine tool, the combination with a reciprocating member, a feed motor for effecting feeding movements of the cutting tool on the machine, and a pilot switch for closing the circuit of the feed motor in accordance with the operation of the reciprocating member, of two limit switches mechanically connected to said motor for rotation at different speeds and adapted to effect different lengths of feeding movements by the motor, and a switch for selectively connecting the motor to said limit switches.

5. In a control system for a machine tool, the combination with a feed motor, and a pilot switch for operating the feed motor, of a limit switch operated by the feed motor for limiting the feeding movements, a second limit switch operated by said motor for changing the limit of the feeding movements, and electrical means for selectively connecting the feed motor to one of said limit switches.

6. In a control system for a machine tool, the combination with a feed motor, and a pilot switch for operating the feed motor, of two limit switches operated at different speeds by the feed motor and serving to limit the feeding movements of said motor, and means comprising a switch for connecting one or the other of said limit switches to the feed motor according to the length of feeding movements desired.

7. In a control system for a machine tool, the combination with a feed motor, and a pilot switch for operating the feed motor in accordance with the operation of the machine tool, of a shaft operated by the feed motor, a limit switch mounted on said shaft and adapted to limit the feeding movements, a second limit switch geared to said first limit switch, said gearing serving to operate the second limit switch at a different speed from the first limit switch to change the length of the feeding movements, and means comprising a switch for selectively connecting the motor to one of the limit switches.

8. In a control system for a machine tool, the combination with a feed motor, and a pilot switch for operating the feed motor in accordance with the operation of the machine tool, of a limit switch mechanically connected to the feed motor to be rotated thereby, a second limit switch mechanically connected to the first limit switch to be rotated at a different speed, and means for selectively connecting the motor electrically to the limit switches.

9. In a control system for a machine tool, the combination with a reciprocating member, a feed motor for effecting feeding movements of the cutting tool on the machine, and a pilot switch for operating the feed motor in accordance with the movement of the reciprocating member, of a shaft operated by the feed motor, a limit switch mounted on said shaft and adapted to limit the feeding movements, a second limit switch geared to said first limit switch, said gearing serving to operate the second limit switch at a different speed from the first limit switch to change the length of the feeding movements, and means comprising a switch for selectively connecting the motor to one of said limit switches.

10. In a control system for a machine tool, the combination with a reciprocating member, a main motor for operating the reciprocating member, a feed motor for effecting feeding movements of the cutting tool on the machine, and a pilot switch for controlling the main motor and for closing the circuit of the feed motor in accordance with the operation of the reciprocating member, of two limit switches operated by the feed motor for limiting the feeding movements to different amounts and a switch for connecting the feed motor to be operated by either one of the said switches.

In testimony whereof, I hereto affix my signature.

HAROLD L. BLOOD.